Nov. 20, 1945.  C. F. KIRBY  2,389,316
RULE SETTING GAUGE
Filed Sept. 12, 1942
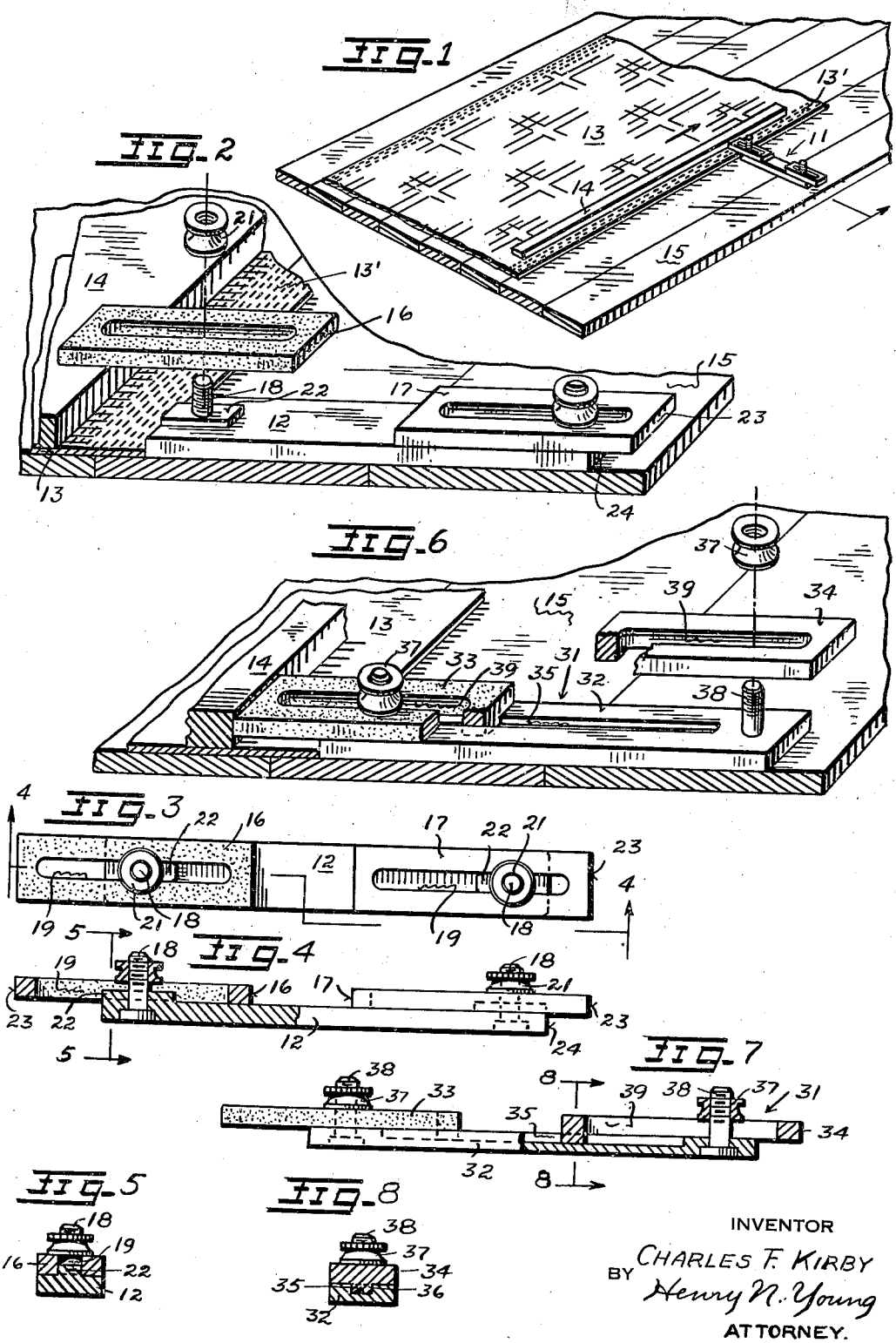
INVENTOR
CHARLES F. KIRBY
BY Henry N. Young
ATTORNEY.

Patented Nov. 20, 1945

2,389,316

UNITED STATES PATENT OFFICE 2,389,316

RULE SETTING GAUGE

Charles F. Kirby, Berkeley, Calif., assignor to himself and Charles R. Kirby, Berkeley, Calif., as joint tenants Application September 12, 1942, Serial No. 458,095

5 Claims. (Cl. 33—103)

The invention relates to an adjustable gauge for setting a rule for the marking or cutting of strip goods in lines truly parallel to the side edges of the goods.

A general object of the invention is to provide an improved gauge for application to the strip of goods while the strip is disposed on a marking and/or cutting surface.

Another object is to provide a gauge which may be pre-set for its selective use at either edge of a strip for the positioning of a rule at different distances from the different strip edges as reference lines.

A further object is to provide a gauge structure in which relatively adjustable elements are constrained to adjustments in a straight line.

Yet another object is to provide a double-ended gauge in which the different gauging ends are differentiated for their identity and use at the appropriate edges of a strip for which different distances of gauging may be required.

The invention possesses other objects and features of advantage, some of which, with the foregoing, will be brought out or be apparent in the following description of typical embodiments of the invention, and in the accompanying drawing, in which, Figure 1 is a perspective view showing a gauge embodying the invention operatively applied for setting a rule upon wallpaper or the like.

Figure 2 is an enlarged fragmentary view taken on the line 2—2 in Figure 1, certain gauge elements being shown as vertically displaced from their operative positions in the structure.

Figure 3 is a plan view of the gauge structure shown in Figure 2.

Figure 4 is a partly sectional view taken on the line 4—4 in Figure 3.

Figure 5 is a sectional view at 5—5 in Figure 4.

Figure 6 is a view corresponding to Figure 2 and showing another embodiment of the gauge, parts of certain gauge elements being broken away.

Figure 7 is a longitudinal and partly sectional view of the gauge of Figure 6.

Figure 8 is a sectional view at the line 8—8 of Figure 7.

Noting that the inner lines of the selvedge edges of wallpaper, and other printed strip goods, are not always parallel to the adjacent strip edges and may be crooked whereby they are not dependable for defining cutting lines, the present gauge has been provided for use in setting a rule for the marking and/or cutting of the goods in straight lines which are truly parallel to the original edges of the goods which are used as reference lines. Essentially, the present gauge comprises a base member for positioning upon a support surface to laterally engage an edge of a strip of sheet material upon the surface, and a spacing arm member mounted on the base for extension over the engaged goods as a line-defining means. Also, since wallpaper and other strip goods may have selvedge edges of different widths, the present gauge has a double-ended structure providing a pair of spacing arm members for mutually independent settings for their use from the different strip edges.

Figures 1 to 5 inclusive disclose a gauge 11 comprising an elongated and rectangular base member 12 arranged to have either end thereof placed against a side edge of a strip 13 having selvedge portions 13' to be cut from it by the application of a cutting tool (not shown) applied along an edge of a rule or straightedge 14. An appropriate positioning of the rule 14 upon a strip 13 disposed on a cutting surface 15 provided by a cutting board or the like is effected by applying the rule between points found at the ends of spacing arm members 16 or 17 mounted on the base member 12 and adjustably extended beyond the different base ends in accordance with the width of the selvedge, or other portions, to be cut from a strip 13.

With a member 16 or 17 having a portion thereof extending from the base 12 over the strip 13, the application of the gauge at two different points along the strip side edge while the adjacent base end engages the strip edge provides a line to which the working edge of the rule may be applied for setting the rule in truly parallel relation to said strip edge. To provide a line for setting the rule, the strip could be marked at the free end of an arm 16 or 17 at spaced points of application of the gauge base to a strip edge, or could have the rule directly applied against the end of the arm while the gauge is disposed at a gauging point; the latter is indicated in Figure 1.

Means are provided for setting the arms 16 and 17 on the common base member 12 to extend the required adjusted distance from the adjacent base end. As particularly shown, bolts 18 have their heads embedded in the base 12 near its extremities and in its central longitudinal line, and extend upwardly from the base through longitudinal slots 19 of uniform width provided in the members 16 and 17 to protrude above the members for receiving nuts 21 for application to clamp the members to the base in set positions thereon.

Means are preferably provided for confining the members 16 and 17 upon the base 12 to adjustments in a fixed line longitudinally of the base. As is particularly shown, rectangular bosses 22 extend integrally from the top of the base 12 at the bolts 18 for fitted and sliding engagement in the slots 19; the bosses 22 are of such length that the sliding engagement of their opposite sides with the opposed slot sides is operative to confine any movement of the arm members 16 and 17 to the desired fixed line with respect to the base. Noting that the faces 23 at the outer ends of the members 16 and 17 are parallel to the corresponding end faces 24 of the base 12, the engagement of a base face 24 flat against a strip edge insures a gauged spacing of the corresponding face 23 from said edge.

Since, as noted, the widths of portions to be cut from opposite sides of a strip may be different, the members 16 and 17 would be independently set for use at the different strip edges; accordingly, with the double-ended gauge structure shown, it is desirable that the different gauging arms of the gauge be differentiated to the user thereof. In the present instance, the members 16 and 17 are differentiated by having their exposed surfaces of different finish and/or color so that the operator may remember which member is to be used at the particular side edge for which it was set. It will be understood that the arm members 16 and 17 might be otherwise differentiated, as by the provision of different characters thereon.

The gauge 31 of Figures 6 to 8 inclusive is arranged to be used in the same manner as the gauge 11, and differs from the latter only on the manner of restraining the gauging arms 33 and 34 thereof to adjustments in the longitudinal line of the base 32. In this gauge structure, the upper face of the elongated rectangular base 32 is provided with an interior longitudinal slot 35 of uniform width, and the inner ends of the longitudinally slotted arms 33 and 34 are provided with dependent bosses 36 which constantly and slidably engage the sides of the slot 35 when clamp nuts 37 are loosened on bolts 38 which extend through the slots 39 of the arm members from end points of the base 32. The slots 39 of the arm elements 33 and 34 closely and slidably receive the bolts 38 whereby said bolts and the bosses 36 are cooperative to maintain a rectilinear adjustment of the elements, and the outer end faces of the elements are constantly maintained in parallel relation to the adjacent end faces of the base 32, as in the first-described embodiment. While the present slot 35 actually extends as a groove from the upper base face, it will be understood that it might extend to the bottom of the base without affecting the use of the gauge in the described manner.

From the foregoing description taken in connection with the accompanying drawing, the advantages of the present gauge will be readily understood by those skilled in the art to which the invention appertains. While I have described the features and principles of operation of structures which I now consider to be preferred embodiments of my invention, I desire to have it understood that the showing is primarily illustrative, and that such changes may be made, when desired, as fall within the scope of the following claims:

I claim:

1. A gauge for use in setting a free rule in parallel relation to a relatively long straight side edge of a sheet of flexible material disposed on a support surface, comprising an elongated and relatively narrow base member for direct positioning disposal upon said surface and having a flat end transverse to its bottom plane arranged for abutting engagement with said edge of the sheet while supported upon said surface, and an elongated arm member mounted on said base longitudinally thereof to dispose its free end transversely beyond said flat base end and in spaced relation to the bottom plane of the base member for spacedly overlying a sheet having its straight edge engaged by said flat side of the base member when the base is supportedly mounted upon the surface beside the sheet, said free end of the arm member providing a reference stop for use in positioning the rule upon the sheet.

2. In a gauge for use for locating a point at a predetermined distance from a side of an elongated strip of sheet material disposed on a flat support surface, a base member for direct supported disposal upon said surface and having a flat reference end transverse to its bottom for flat abutting engagement with and along said sheet edge while the base member rests flat upon said support surface, an arm member for mounting on said base to extend longitudinally thereof and laterally therebeyond to spacedly overlie a sheet engaged by the base member with its free end defining a gauge point, and cooperating means of the members mutually engaging them for the sliding adjustment of the arm member upon the base member solely in a straight line longitudinally thereof for adjustably disposing the gauge point of the arm with respect to said reference end of the base.

3. A structure in accordance with claim 2 having the last means comprising a straight interior slot in one member and an integral boss of the other member extending into the slot in guided engagement with the slot sides.

4. A structure in accordance with claim 2 having the last means comprising a straight slot in the arm member guidedly receiving a boss extending from the base member.

5. A structure in accordance with claim 2 having the last means comprising a straight slot in the base member receiving a boss extending from the arm member.

CHARLES F. KIRBY.